US012015252B2

(12) United States Patent
Marben et al.

(10) Patent No.: US 12,015,252 B2
(45) Date of Patent: *Jun. 18, 2024

(54) WIRELESS CONTROL IN A CABLE FEEDER AND PULLER SYSTEM

(71) Applicant: Greenlee Tools, Inc., Rockford, IL (US)

(72) Inventors: Daniel John Marben, Rockford, IL (US); Eric Williams, Rockford, IL (US); Satishkumar SivaSankaran, Rockford, IL (US); Derald Damitric Woods, Rockford, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,017

(22) Filed: Feb. 3, 2023

(65) Prior Publication Data

US 2023/0178969 A1    Jun. 8, 2023

Related U.S. Application Data

(63) Continuation of application No. 17/459,286, filed on Aug. 27, 2021, now Pat. No. 11,575,250, which is a (Continued)

(51) Int. Cl.
*H02G 1/08* (2006.01)
*H04B 17/318* (2015.01)

(52) U.S. Cl.
CPC ............. *H02G 1/08* (2013.01); *H04B 17/318* (2015.01)

(58) Field of Classification Search
CPC ........ H04B 17/318; H04B 17/23; H02G 1/08; G08C 17/02; G08C 2201/30; G08C 2201/50; G05B 19/0428
See application file for complete search history.

(56) References Cited

U.S. PATENT DOCUMENTS

| | | |
|---|---|---|
| 4,839,533 A | 6/1989 | Aga |
| 5,734,206 A | 3/1998 | Keizer et al. |

(Continued)

FOREIGN PATENT DOCUMENTS

| | | | |
|---|---|---|---|
| KR | 101486212 B1 | | 1/2015 |
| KR | 20150103466 A | | 9/2015 |
| KR | 20150103466 A | * | 9/2015 |

OTHER PUBLICATIONS

"Notification of Transmittal of the International Search Report and the Written Opinion of the International Searching Authority, or the Declaration," PCT/US2021/048038, dated Dec. 21, 2021.

(Continued)

*Primary Examiner* — Adnan Aziz
(74) *Attorney, Agent, or Firm* — Klintworth & Rozenblat IP LLP

(57) ABSTRACT

A control module for controlling a cable pulling or feeding apparatus at one endpoint of a pulling operation and for wirelessly communicating with a cable feeding or pulling apparatus at an opposite endpoint. The control module includes a switch input to receive a start signal from a switch for initiating operation of the apparatus and an equipment output that connects to the pulling/feeding apparatus. A wireless communication interface communicates ready state or stop state messages to the other apparatus to coordinate a pulling operation. The control module operates in one of two modes: endpoint mode or repeater mode. In repeater mode, the control module may be positioned between the endpoints to extend the wireless communications between the endpoints.

18 Claims, 10 Drawing Sheets

Related U.S. Application Data continuation-in-part of application No. 17/005,885, filed on Aug. 28, 2020, now Pat. No. 11,361,656.

(56) References Cited

U.S. PATENT DOCUMENTS

| | | | |
|---|---|---|---|
| 6,211,581 B1* | 4/2001 | Farrant | G06F 3/0219 307/115 |
| 7,723,630 B1 | 5/2010 | Jordan et al. | |
| 8,058,578 B1 | 11/2011 | Jordan et al. | |
| 8,485,501 B1 | 7/2013 | Hard | |
| 9,576,475 B2* | 2/2017 | Bardin | H04W 4/80 |
| 10,076,809 B2 | 9/2018 | Rappl et al. | |
| 10,345,170 B2 | 7/2019 | Jubeck et al. | |
| 10,782,198 B2* | 9/2020 | Jubeck | G01L 1/125 |
| 2010/0141578 A1 | 6/2010 | Horiuchi et al. | |
| 2011/0227012 A1 | 9/2011 | Wang et al. | |
| 2015/0068318 A1 | 3/2015 | Bardin et al. | |
| 2016/0045971 A1 | 2/2016 | Holverson | |
| 2017/0050257 A1 | 2/2017 | Leiteritz et al. | |
| 2017/0097627 A1 | 4/2017 | Bardin et al. | |
| 2017/0248481 A1 | 8/2017 | Bubar et al. | |
| 2018/0013270 A1 | 1/2018 | Jubeck et al. | |
| 2019/0341752 A1 | 11/2019 | Radichel et al. | |
| 2019/0344371 A1 | 11/2019 | Denis et al. | |
| 2020/0158091 A1 | 5/2020 | Sen et al. | |
| 2020/0295555 A1 | 9/2020 | Jackson et al. | |

OTHER PUBLICATIONS

"International Search Report," PCT/US2021/048038, dated Dec. 21, 2021.

"Written Opinion of the International Searching Authority," PCT/US2021/048038, dated Dec. 21, 2021.

"Southwire Tools & Equipment Operating Instructions—Southwire, Triggers, Wireless Safety Switch System TSS-01," Southwiretools.com, 2018, 69 pages.

"Southwire Tools & Equipment Operating Instructions—Southwire, Triggers, Wireless Safety Switch System TSS-01," Southwiretools.com, 2016, 20 pages.

* cited by examiner

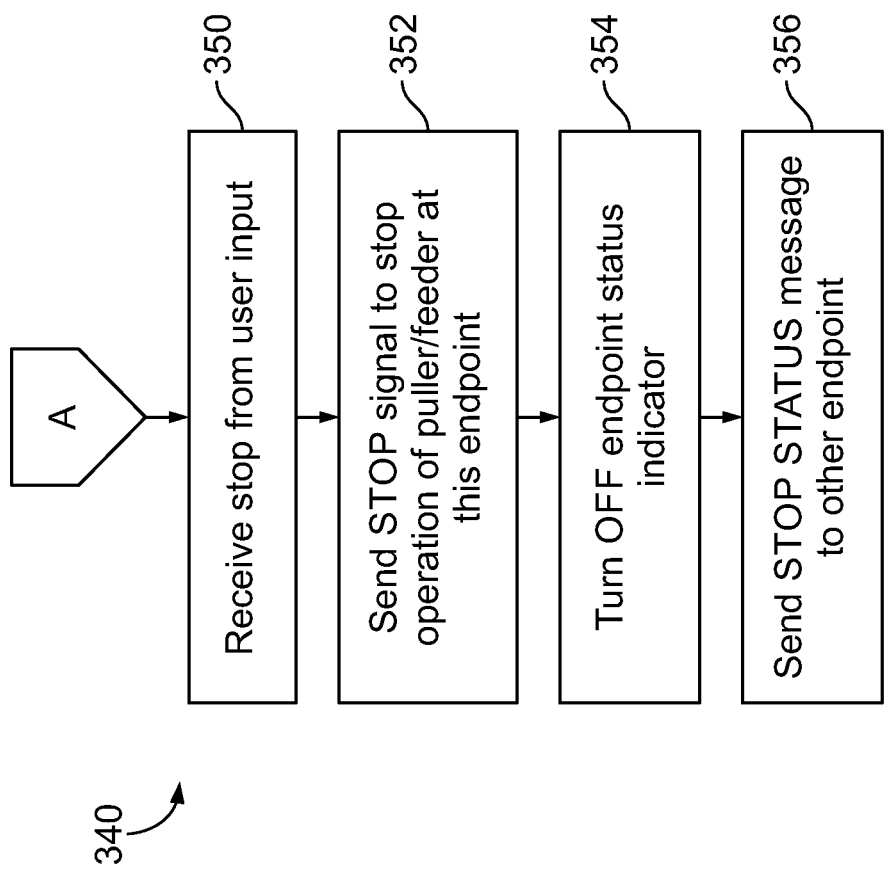

WIRELESS CONTROL IN A CABLE FEEDER AND PULLER SYSTEM

INCORPORATION BY REFERENCE

This application is a continuation application U.S. patent application Ser. No. 17/459,286 filed on Aug. 27, 2021, which is a continuation-in-part of U.S. patent application Ser. No. 17/005,885 filed on Aug. 28, 2020, now U.S. Pat. No. 11,361,656 issued Jun. 14, 2022, all of which are incorporated herein by reference in its entirety.

FIELD OF THE DISCLOSURE

The present disclosure relates to wireless control in a cable installing system.

BACKGROUND

When cables, such as electrical, coaxial, telephone cables, etc. are first installed in a building, the cables are typically run through a conduit which has been previously installed in the walls of the building. The process for running the cables through the conduit typically starts with a worker shooting or blowing a "mouse" (a form of a foam plug) through the conduit where the mouse is connected to the end of a strong, lightweight nylon cord. Blowing of the mouse is achieved by placing the mouse in the conduit and applying air pressure behind the mouse to force it through the conduit. The mouse has a diameter which is slightly less than the diameter of the conduit. Therefore, the air pressure which is applied behind the mouse causes the mouse to move through the conduit, pulling the lightweight nylon cord with it.

After the mouse has been blown through the conduit such that the mouse appears at the other end of the conduit, a pulling rope, such as a heavier synthetic rope or steel cable, is connected to the end of the nylon cord, and the nylon cord is pulled back through the conduit so that the pulling rope is pulled through the conduit. Once the nylon cord has been pulled completely back through the conduit and the end of the pulling rope appears at the end of the conduit, a grouping of cables, where each cable is carried on an individual spool, reel or the like, is connected to the end of the pulling rope which has not yet entered the conduit. Then, the pulling rope is pulled completely through the conduit as the cables unwind from their respective spools, reels or the like, and the cables advance in the conduit. Once the cables appear at the end of the conduit, the cables are disconnected from the pulling rope, and the installation of the cables in the conduit is complete.

The pulling rope and attached cables are typically pulled by a cable puller. A cable feeder is often used to reduce the load on the cable puller by applying a tractive force on the cable bundle, to unload the cables from the spools, as it enters the conduit. The cable puller and, when used, a cable feeder, form a cable installing system.

The cable puller and cable feeder may include motorized rotating members to generate the pulling and feeding forces needed to run the cable through the conduit. Such cable installing systems may be particularly advantageous in installations where the cable is large and when the conduit path is long or where the conduit path has one or more bends or when the conduit path traverses structures that block the line of sight between the endpoints. In such installations, a communication link may likely be needed between the operator of the cable puller and the operator of the cable feeder. The communications link allows the operators at the endpoints of the installation to inform each other as to when each is ready to start the operation of the equipment or if the operation should stop due to problems, or when the operation is complete and should be stopped. Current cable installation systems rely on the use of standard radio, mobile phones, or other two-way, two-person communications systems. As a result, coordination between operators of the puller/feeder equipment can be impeded by communication issues, such as noise, poor signals between the communications devices used.

SUMMARY

In view of the above, a control module is provided in a cable installing system for wirelessly communicating between a first apparatus and a second apparatus. The first apparatus is either a cable pulling apparatus or a cable feeding apparatus at a first endpoint and the second apparatus is either a cable feeding apparatus or a cable pulling apparatus at a second endpoint. In some implementations, only a cable pulling apparatus is used and the control module may be used to coordinate the cable installation between two operators. The control module is connected for operation at the first apparatus and includes a switch input configured to receive an operator input signal from a user-actuated switch. An equipment output on the control module is configured to send a start signal to initiate operation of the apparatus connected to the equipment output. A wireless communication interface transmits an apparatus status signal indicating a ready state or a stop state for the apparatus. The control module includes a processor configured to execute stored machine instructions to:
  receive the operator input signal and transmit via the wireless communication interface a ready message indicating readiness of the apparatus to the second endpoint when the apparatus is connected to the control module,
  receive a ready state signal indicating readiness at the second endpoint via the wireless communication interface when the apparatus is connected to the control module,
  initiate operation of the apparatus by sending the start signal to the apparatus via the equipment output responsive to receiving the ready state signal when the apparatus is connected to the control module,
  receive wirelessly communicated signals from a second control module connected to either the first endpoint or the second endpoint when the control module is configured to operate as a repeater, and
  send the wirelessly communicated signals received from the second control module to a third control module connected to either the second endpoint or the first endpoint when the control module is configured to operate as a repeater.

In one aspect, the first apparatus is either a cable pulling apparatus or a cable feeding apparatus, the second apparatus is the other of the cable feeding apparatus or the cable pulling apparatus, the apparatus status signal is a first apparatus status signal, and the second apparatus transmits a second apparatus status signal. The control module includes a display configured to display a puller status indicator according to the ready state or stop state of the cable pulling apparatus, and a feeder apparatus status indicator according to the ready state or stop state of the cable feeding apparatus. The processor is configured to illuminates the puller status indicator responsive to receiving the operator input signal and the feeder status indicator responsive to receiving the second apparatus status signal when the first apparatus is the cable pulling apparatus. The feeder status indicator is illuminated responsive to receiving the operator input signal and the puller status indicator responsive to receiving the second apparatus status signal when the first apparatus is the cable feeding apparatus.

In another aspect, the control module further comprises a puller endpoint mode selector to indicate a puller endpoint mode when an operator presses the puller endpoint mode selector and the first apparatus is the cable pulling apparatus. A feeder endpoint mode selector is included to indicate a feeder endpoint mode when the operator presses the feeder endpoint mode selector and the first apparatus is the cable feeding apparatus.

In another aspect, a puller status indicator light is included to indicate operation of the control module as controller of the puller apparatus, and a feeder status indicator light is included to indicate operation of the control module as controller of the feeder apparatus.

In another aspect, a repeater mode selector is included, the repeater mode selector being configured to switch the control module to operate in a repeater mode according to selection by an operator. A repeater mode indicator is included to indicate whether the control module is in the repeater mode.

In another aspect, the wireless communications interface includes a signal strength analyzer. The display is configured to display a signal strength indicator indicative of a signal strength measured by the signal strength analyzer.

In another aspect, the puller status indicator illuminates when the repeater mode selector has been triggered to operate the control module in repeater mode and when signals are communicated between the control module operating in the repeater mode and the endpoint operating the puller apparatus. The feeder status indicator illuminates when the repeater mode selector has been triggered to operate the control module in repeater mode and when signals are communicated between the control module operating in the repeater mode and the endpoint operating the feeder apparatus.

In another aspect, the wireless communications interface includes a plurality of wireless communications channels.

In another aspect, a plurality of channel selectors enables communications on the corresponding wireless communication channel selected by the operator. The signal strength analyzer indicates a signal strength for each wireless communication channel to which the control module tunes, and when in repeater mode, the operator selects one of the wireless communication channels by monitoring the signal strength of each channel.

In another aspect, a method is provided for repeating wireless signals between a first control module and a second control module, where the first control module controls an apparatus at a first endpoint for installing a cable in conduit between the first endpoint and a second endpoint controlled by the second control module. The method includes the following steps:

selecting the a repeater mode selector at the repeater control module;
illuminate a repeater mode indicator when the repeater control module is configured to operate in the repeater mode;
receiving wireless communication signals from either the first control module or the second control module;
sending the wireless communication signals to either the second control module or the first control module;
illuminating a first endpoint status indicator when wireless communications signals are communicated between the repeater control module and the first control module; and
illuminating a second endpoint status indicator when wireless communications signals are communicated between the repeater control module and the second control module.

In another aspect, the repeater control module includes a stop selector configured to communicate a stop message to each of the first endpoint and the second endpoint when pressed by the operator of the repeater control module. The apparatuses at the first and second endpoints receive the stop message and stop operation of the corresponding apparatuses.

BRIEF DESCRIPTION OF THE DRAWINGS

FIGS. 5A and 5B are flowcharts illustrating operation of an example method for controlling a cable installing system.

DETAILED DESCRIPTION

Figure 1A:
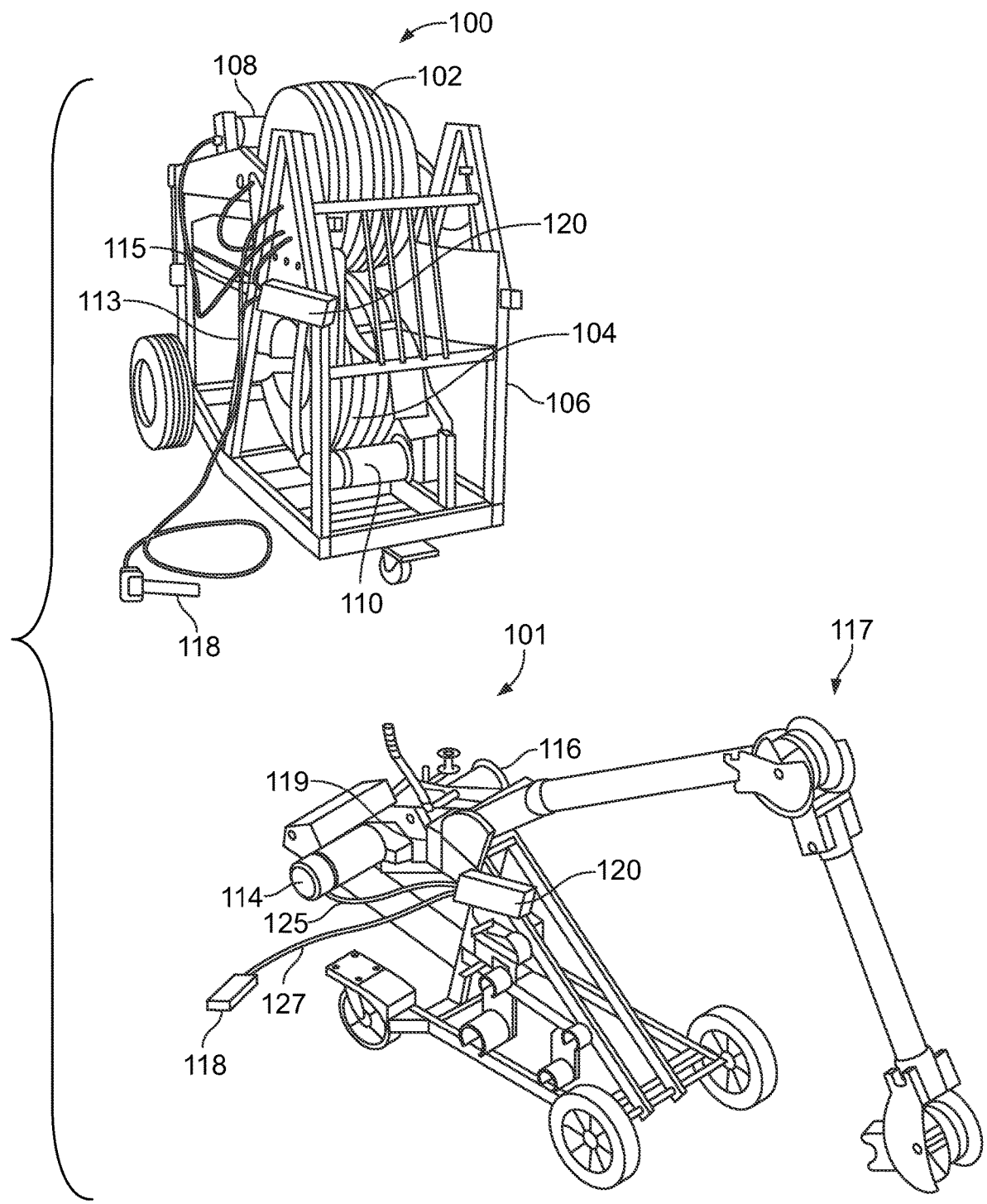
FIG. 1A is an isometric view of an example cable feeder and cable puller configured to operate using an example implementation of a control module.

While the disclosure may be susceptible to embodiment in different forms, there is shown in the drawings, and herein will be described in detail, example embodiments with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

FIG. 1A is an isometric view of an example cable feeding apparatus 100 and an example cable pulling apparatus 101 configured to operate using an example implementation of a control module 120. A cable installing system may include a cable feeding apparatus 100 and cable pulling apparatus 101 each controlled by a control module 120 during a cable installation operation. The cable installing system may take the form of several configurations as described below with reference to FIG. 1B. FIG. 2 is an isometric view of an example implementation of the cable feeding apparatus 100 and an example implementation of the cable pulling apparatus 101 illustrating operation of a cable installing system 103 using the example implementation of the control module 120.

The example cable feeding apparatus 100 in FIG. 1A includes upper and lower rotating members 102, 104 mounted on a frame 106. Each rotating member 102, 104 may be a pneumatic tire whose internal air pressure can be selectively varied when pressed against each other and with a cable therebetween as described in more detail with reference to FIG. 2. Motors 108, 110 are mounted to the frame 106 and are drivably connected to the respective rotating members 102, 104 to cause rotation of the rotating members 102, 104 to pull pulling rope(s)/cable(s) therethrough for forwarding to a conduit, again, as described in more detail below with reference to FIG. 2. In an embodiment, each motor 108, 110 may be a permanent magnet DC motor. The control module 120 may be mounted anywhere on the frame 106 of the cable feeding apparatus 100. A connection 115 is made between the control module 120 and the cable feeding apparatus 100 to initiate operation when appropriate according to the examples described below. A switch 118 connects to the control module 120 at connection 113 to allow a user to initiate operation by signaling the control module 120. The switch 118 in FIG. 1A is a hand switch. The switch 118 may also be a foot switch as described further below.

The cable pulling apparatus 101 in FIG. 1A includes a motor 114 configured to drive a capstan 116 both mounted on a frame 119. A control module 120 is mounted on the frame 119 and includes a first connection 125 to the cable pulling apparatus 101 to initiate operation when appropriate according to the examples described below, and a second connection 127 extending to a switch 112. The switch 112 depicted in FIG. 1A is a foot switch. A hand switch may also be used to control operation of the pulling apparatus 101 by signaling the control module 120. During operation, a pulling rope is engaged with the capstan 116 on the cable pulling apparatus 101. When operation is started, the cable pulling apparatus 101 pulls the pulling rope, which wraps around the capstan 116 as the motor 114 turns. A boom assembly 117 is attached to the cable pulling apparatus 101 to receive the pulling rope and to feed the pulling rope to the capstan 116.

Referring to FIG. 2, the cable feeding apparatus 100 feeds a cable 105 through a conduit 107. The cable 105 is pulled via a rope by the cable pulling apparatus 101 during a cable installation process. The single pulling rope/cable 105 may be pulled from a single reel 111 as shown in FIG. 2, or multiple pulling ropes/cables (not shown). The pulling rope(s)/cable(s) 105 pass through the cable feeding apparatus 100 and then into the conduit 107.

The example cable feeding apparatus 100 in FIG. 2 includes a control module 120a configured to initiate operation when appropriate according to the examples described below. The hand switch 118 connects to the control module 120a to allow a user to signal the control module 120a during operation. The cable pulling apparatus 101 in FIG. 2 includes a control module 120b configured to initiate operation when appropriate according to the examples described below. The foot switch 112 connects to the control module 120b to allow a user to signal the control module 120b during operation. During operation, the pulling rope is engaged with the capstan 116 on the cable pulling apparatus 101. When operation is started, the cable pulling apparatus 101 pulls the pulling rope, which wraps around the capstan 116 as the motor 114 turns. A boom assembly 117 is attached to the cable pulling apparatus 101 to receive the pulling rope and to feed the pulling rope to the capstan 116.

It is noted that the example in FIG. 2 depicts the puller control module 120b connected to the pulling apparatus 101 in wireless communication with the feeder control module 120a connected to the feeding apparatus 100. In other implementations, only one control module 120 may be connected to a pulling or feeding apparatus to wirelessly communicate with a feeding or pulling apparatus at an opposite endpoint that includes wireless communications capabilities integrated within the apparatus at the opposite endpoint. It is further noted that in another example, the puller control module 120b may connect to the cable pulling apparatus 101 in wireless communication with another control module 120a used by another operator at the feeder endpoint without the use of the cable feeding apparatus 100. Example configurations are illustrated in FIG. 1B.

Figure 1B:
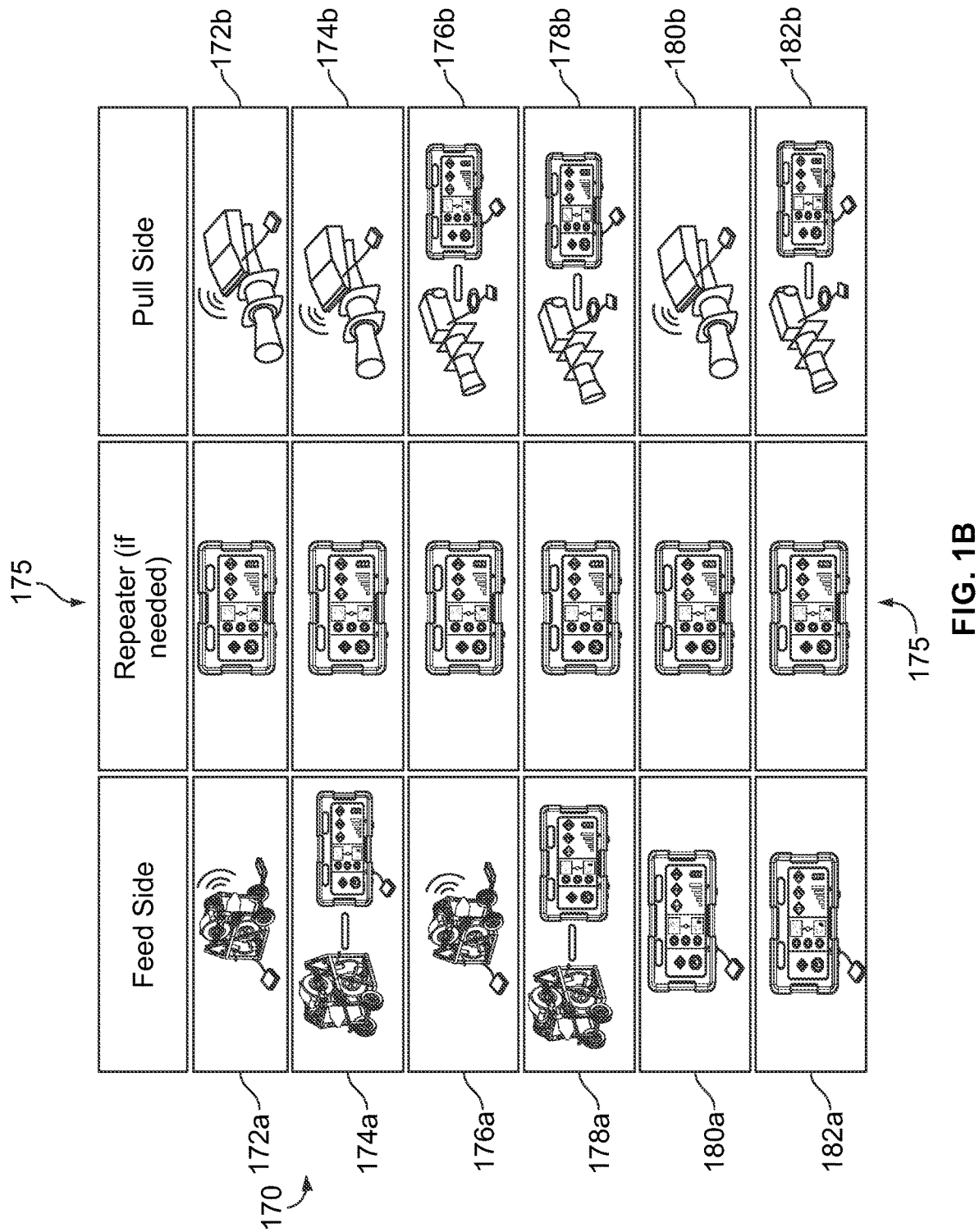
FIG. 1B is a table of configurations of cable installing systems in which example implementations may be advantageously used.
Figure 2:
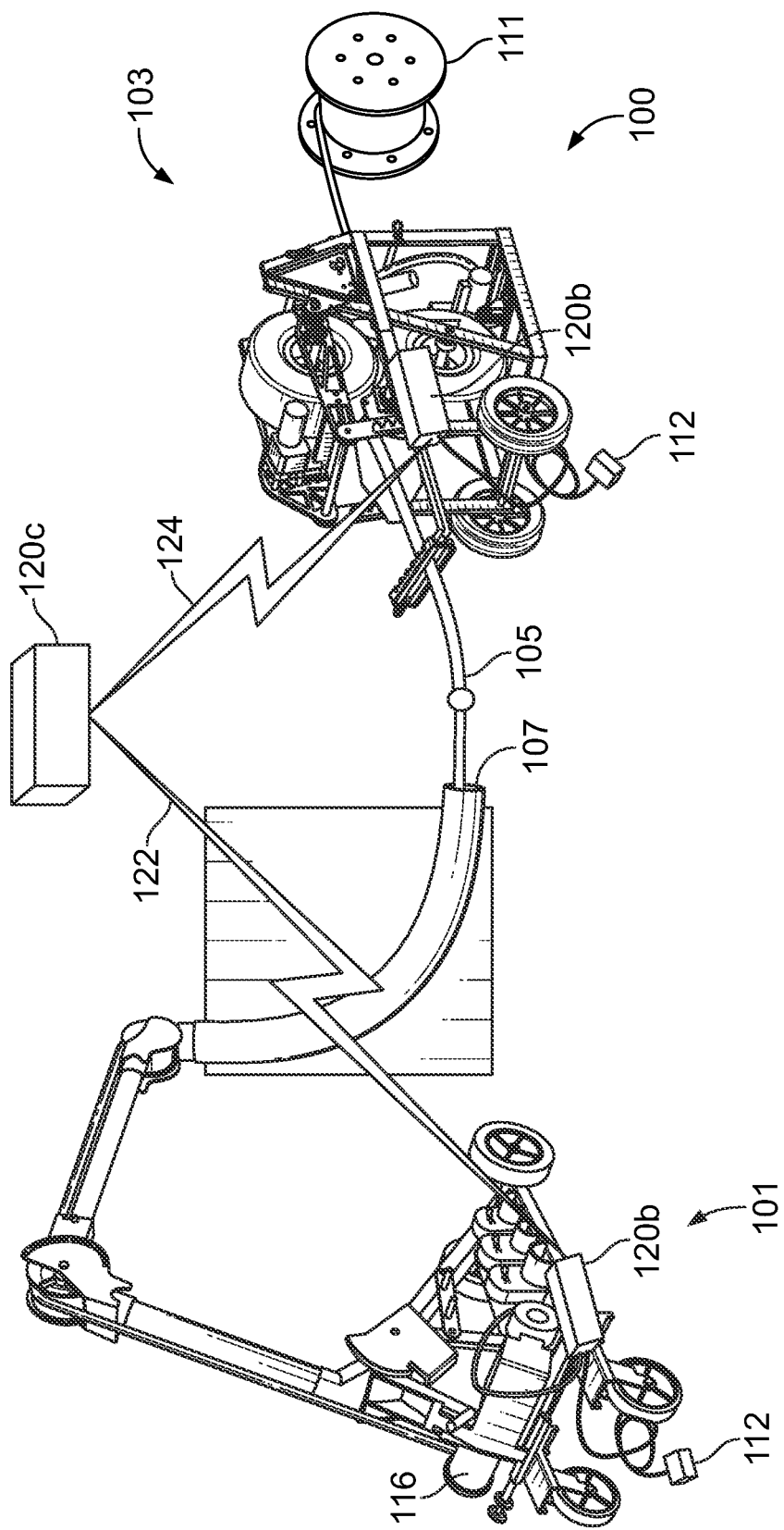
FIG. 2 is an isometric view of an example implementation of a cable feeder and an example implementation of a cable puller illustrating operation of the cable installing system using the example implementation of the control module.

FIG. 1B is a table of configurations 170 of cable installing systems in which example implementations may be advantageously used. The table of configurations 170 includes equipment that may be used at a feed side of the cable installation, equipment that may be used at a pull side of the cable installation, and the use, when needed, of a repeater between the feeder side and the pull side at column 175. The table of configurations 170 in FIG. 1B includes:

1. Configuration 172 having a cable feeding apparatus with an integrated wireless communications control module at the feed side 172a and a cable pulling apparatus with an integrated wireless communications control module at the pull side 172b. The control module would not be needed at the endpoints (feed side and pull side) in the example at 172a and 172b in FIG. 1B. The control module 120 may be implemented in repeater mode between the pull side 172b and the feed side 172a if needed.
2. Configuration 174 having a cable feeder apparatus using a control module at the feed side 174a to communicate with a cable pulling apparatus with an integrated wireless communications control module at the pull side 174b. The control module may be used in repeater mode in the example configuration 174a, 174b.
3. Configuration 176 having a cable feeder apparatus with an integrated wireless communications control module at the feed side 176a to communicate with a cable pulling apparatus having a control module at the pull side 176b.
4. Configuration 178 having a cable feeder apparatus using a control module at the feed side 178a to communicate with a cable pulling apparatus having a control module at the pull side 178b.
5. Configuration 180 having a control module at the feed side 180a to communicate with a cable pulling apparatus with an integrated wireless communications control module at the pull side 180b.
6. Configuration 182 having a control module at the feed side 180a to communicate with a cable pulling apparatus with a control module at the pull side 182b.

Figure 3A:
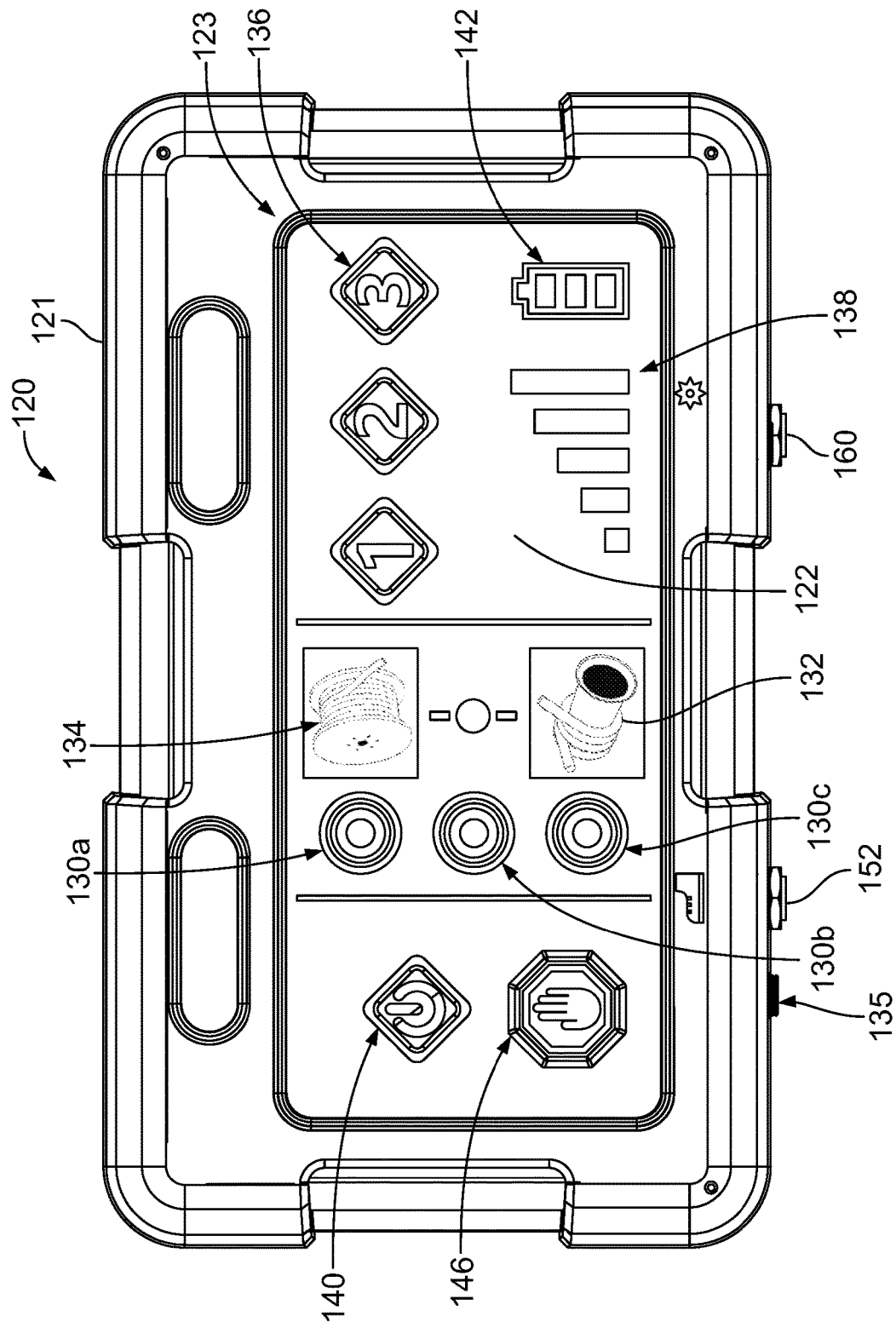
FIG. 3A is a top isometric view of an example implementation of a control module of the type that may be used in the examples illustrated in FIGS. 1A and 1B.
Figure 3B:
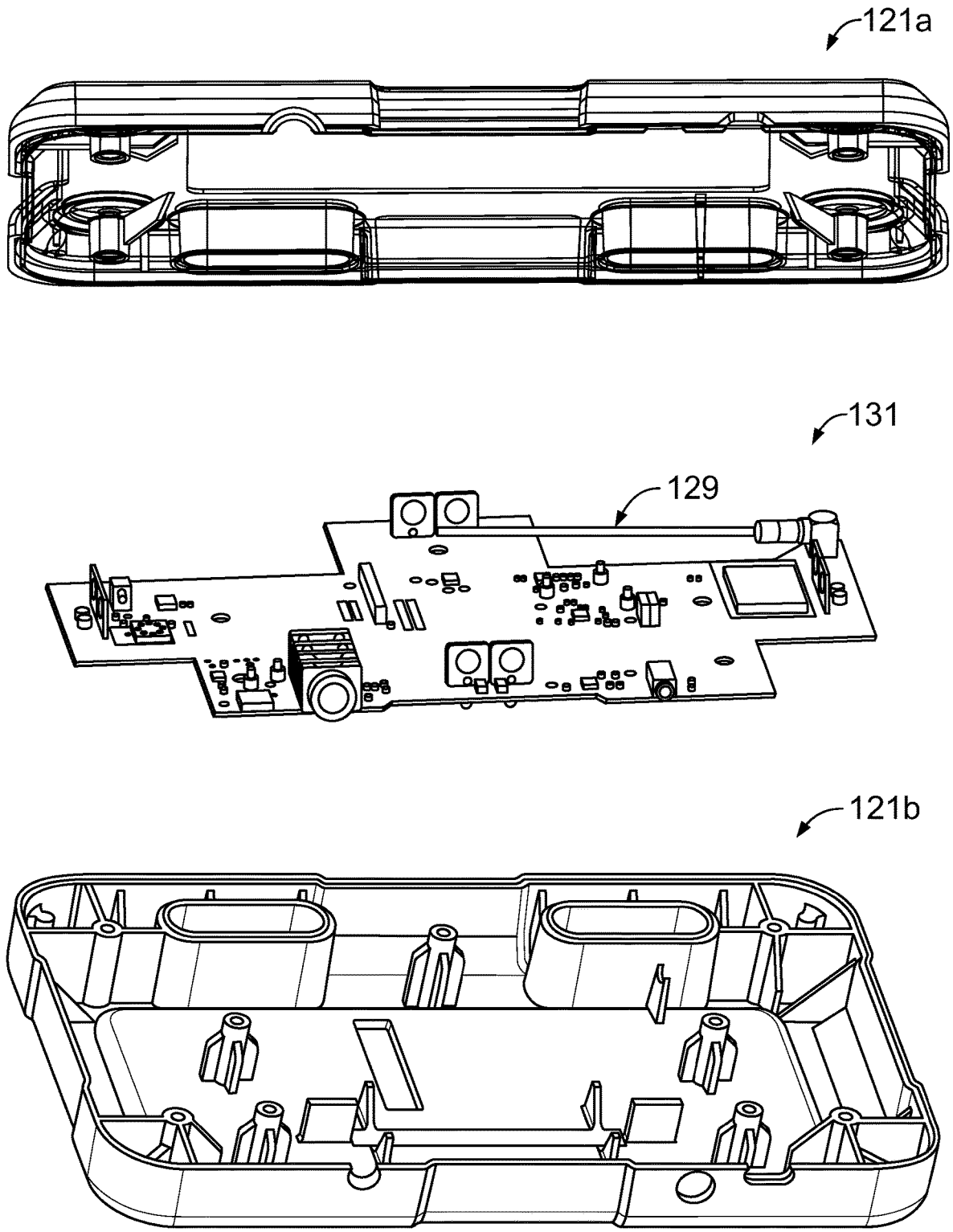
FIG. 3B is an exploded view of the control module including a top housing portion, a bottom housing portion, and a circuit board contained therein.

FIG. 3A is a top view of an example implementation of a control module of the type that may be used in the examples illustrated in FIGS. 1A and 1B. The control module 120 may include a housing 121. FIG. 3B is a top portion isometric view 121a of the housing 121 of the control module 120, a circuit board 131, and an isometric internal view of a bottom portion 121b of the housing 121.

Referring to FIG. 3A, the control module 120 may be enclosed in the module housing 121 with a user interface 123 on one side of the housing 121. The user interface 123 may include a display 122 for displaying visible alerts or indicators. The display 122 may be a touch-panel having touch-sensitive areas on the display that can be pressed to operate as switches. Accordingly, switch devices as described below may be implemented as switches on a touch-panel display 122. In other implementations, any switches described below may also be of a mechanical press type switch. In some examples, the switches may include a light to illuminate a change in state of the switch.

The control module 120 in FIG. 3A may include mode selection switches 130a, 130b, 130c to select a mode of operation. The control module 120 allows for the selection of two basic modes, operation as a repeater or as an endpoint. Two endpoint modes may also be available: a feeder endpoint mode to operate at the feed side endpoint (e.g. in FIG. 1B) and a puller endpoint mode to operate at the pull side endpoint (e.g. in FIG. 1B). FIG. 2 depicts the control module 120a operating in the cable feeder endpoint mode and control module 120b operating in the cable puller endpoint mode. In endpoint mode, the control module 120a,b controls the cable puller/feeder equipment on which it is mounted. The operator may selectively press the feeder endpoint mode selection switch 130a to configure the control module 120 to operate in the cable feeder endpoint mode. The operator may selectively press the puller endpoint mode switch 130c to configure the control module 120 to operate in the cable puller endpoint mode.

In repeater mode, the control module 120c (in FIG. 2) receives wireless signals from either endpoint control module 120a,b and transmits the received wireless signals. Repeater mode allows an operator to position the control module 120c between the endpoints (e.g. at 175 in FIG. 1B) allowing for an extension to the signal path of the wireless signals. The control module 120c in repeater mode also allows for a signal to be re-transmitted when noise or other obstacles impede a clean signal transmission. The operator may selectively configure the control module 120 to operate in the repeater mode by pressing mode selection switch 130b (in FIG. 3A).

It is noted that in an example implementation, a system may include more than one control module 120c operating in a repeater mode to enhance wireless communication between two endpoint control modules (e.g. 120a and 12b). For example, two or more control modules may be operated in a repeater mode in an environment having significant obstructions or a significant distance between the puller endpoint and the feeder endpoint of a cable pulling run. The repeater control modules and the endpoint control modules may operate along the same wireless communication channel. The control module at one endpoint (e.g. puller) may send wireless signals to a first repeater, then to a subsequent repeater until the signals are ultimately received by the control module at the other endpoint (e.g. feeder). Each repeater module simply broadcasts the wireless signal that it receives to another control module on the same channel.

The mode selection switches 130a, 130b, and 130c may include LEDs that turn on and off according to the operating mode of the control module 120. When the operator presses the feeder endpoint mode selection switch 130a, the LED in the switch 130a may turn on to provide an indication that the control module 120 is operating to control the cable feeder apparatus. When the operator presses the puller endpoint mode selection switch 130c, the LED in the switch 130c may turn on to provide an indication that the control module 120 is operating to control the cable puller apparatus. When the operator presses the repeater mode selection switch 130b, the LED in the switch 130b may turn on to provide an indication that the control module 120 is operating as a repeater.

In the endpoint mode, the control module 120 in FIG. 3A may be connected to either a cable puller or cable feeder at one endpoint and configured to communicate wirelessly with the control module 120 connected to the cable feeder or cable puller at the opposite endpoint. The communication between endpoints allows for communication of a ready state or a stop state to allow for coordination between the equipment at the endpoints. In some example implementations, other data may be communicated between the equipment endpoints. For example, real-time data reflecting the status and progress of the pulling operation may be communicated from the puller to the feeder or from the feeder to the puller. A third control module 120 or more than one additional control module 120 may be added to the operation to operate in the repeater mode to ensure a robust radio signal between endpoints.

Cable pulling equipment or apparatuses (either cable pullers or cable feeders) employ a wired connection to start or stop operation of the equipment. The wired connection is typically a foot switch to free the operator's hands for other tasks. In example implementations, the control module 120 may communicate to command the cable equipment to start and stop via a hardwired connection to the cable pulling/feeding apparatus. When the control module 120 receives notification that the opposite endpoint is ready, the control module 120 commands the cable pulling/feeding equipment to start. In example implementations, the control module 120 may include a cable pulling equipment output 160 to allow the control module 120 to start and stop an attached cable pulling/feeding equipment.

The control module 120 in FIG. 3A includes a puller status indicator 132 to indicate the status of the cable pulling apparatus 101 at one endpoint, and a feeder status indicator 134 to indicate the status of the cable feeding apparatus 100 at the other endpoint. The puller status indicator 132 is turned to an on-state (e.g. illuminated) when the cable pulling apparatus 101 is in the ready state. The feeder status indicator 134 is turned on to an on-state when the cable feeding apparatus 100 is in the ready state. If the control module 120 is connected to the cable pulling apparatus 101, the puller status indicator 132 is turned on to indicate the ready state when the operator triggers the switch 112 (in FIG. 1A). The feeder status indicator 134 is turned on when the control module 120 receives a ready message from the cable feeding apparatus 100 at the other endpoint.

The operator may choose one of a plurality of signal channels on which to communicate by pressing a channel selector switch 136. In an example implementation, the control module 120 includes a wireless communication interface that transmits radio signals in a frequency band of 902 to 928 Mhz with software selectable channels for interference immunity. The wireless communications interface includes an antenna 129 mounted on a circuit board 131 disposed in the module housing 121 as shown in FIG. 3B. The channel selector switches 136 may be connected to tune the radio transmission to a selected one of three channels (as shown in FIG. 3A, other examples may provide for more or fewer channels).

A signal strength analyzer may be included in the wireless communication interface to determine a signal strength. The signal strength may be displayed in the display 122 as a signal strength indicator 138 to assist the operator in selecting the best possible channel. When the control module 120 is being used in any of the configurations in FIG. 1B without a repeater, the signal strength indicator 138 indicates signal strength of a signal between the control module at an endpoint and either a control module at the other endpoint or an integrated wireless communications control module at the other endpoint. The operator of the control module at an endpoint can select the channel with the strongest signal by monitoring the signal strength indicator 138 while selecting different channels using the channel selector 136.

In the repeater mode, the channel selectors 136 and signal strength indicator 138 may be used to assist the operator in finding a channel over which two endpoints are communicating. In an example implementation, an operator may be using the control module 120*c* shown in FIG. 3C in repeater mode to facilitate wireless communication between a puller endpoint and a feeder endpoint. As noted above, the control module 120*c* in repeater mode receives signals from either endpoint and sends the signals to the other endpoint. The repeater control module 120*c* enables communication between endpoints too distant for direct communication between the endpoints, or where obstacles between the endpoints weaken direct signal transmission between the endpoints.

Figure 3C:
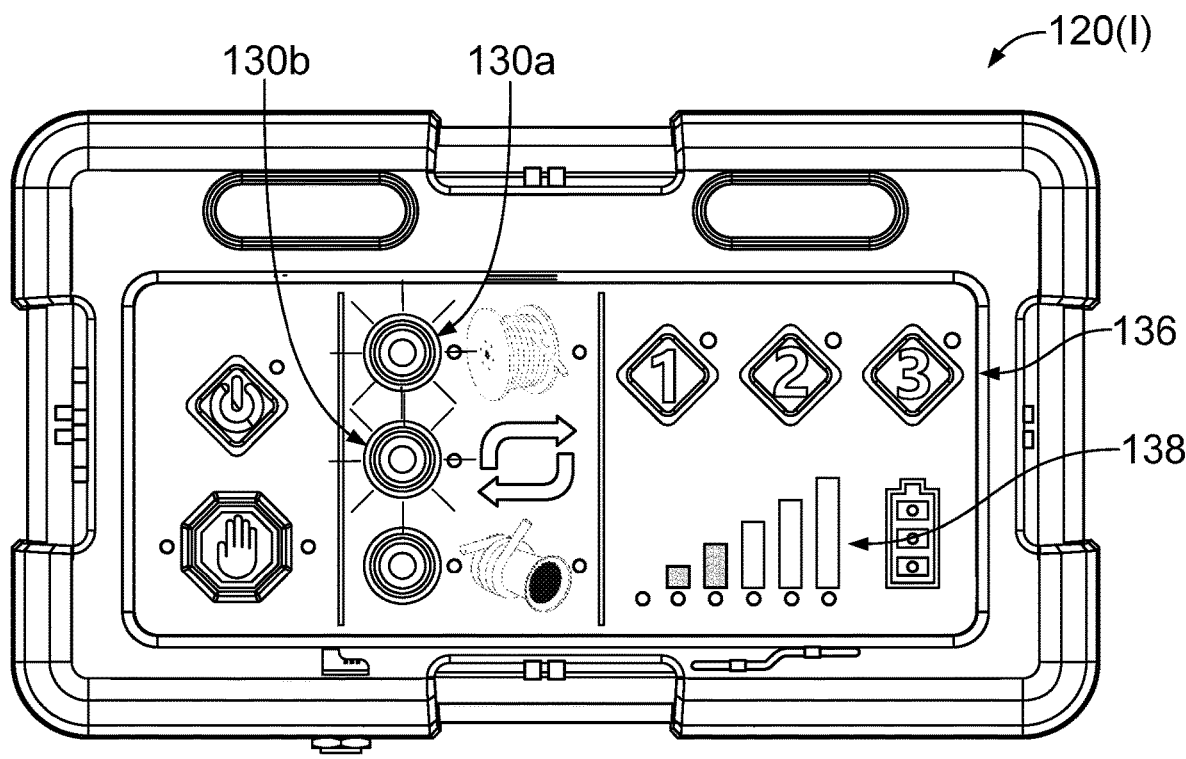
FIG. 3C is a top view of the control module illustrating operation of the control module in the repeater mode.
Figure 3C:
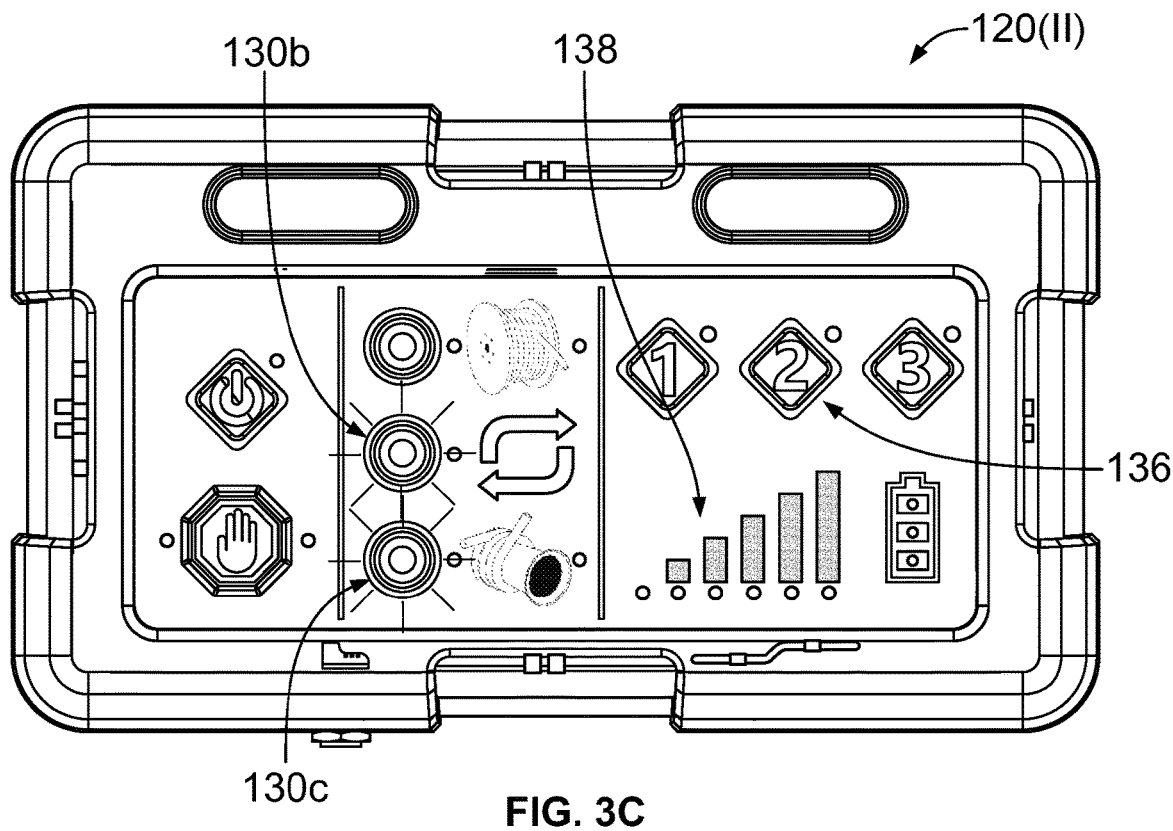

The repeater control module 120*c* in FIG. 3C communicates signals between the repeater control module 120*c* and the feeder endpoint in view 120(I), and between the repeater control module 120*c* and the puller endpoint in view 120(II) in FIG. 3C. When the repeater control module 120*c* is communicating with the feeder endpoint in view 120(I), the feeder mode indicator 130*a* may be illuminated. The repeater mode indicator 130*b* may also be lit or blinking to indicate repeater mode. With the feeder mode indictor 130*a* illuminated, the operator can select different channels at 136 to identify the channel with the strongest signal based on the signal strength indicator 138 when each channel is selected. As shown in view 120(I) in FIG. 3C, the signal strength indicator 138 indicates that the signal between repeater control module 120*c* and feeder is on the weak side with only the first two bars illuminated. The operator can select a next channel to find a stronger signal. Similarly, when the repeater control module 120*c* is communicating with the puller endpoint in view 120(II), the puller mode indicator 130*c* may be illuminated. With the puller mode indictor 130*c* illuminated, the operator can select different channels at 136 to identify the channel with the strongest signal based on the signal strength indicator 138 when each channel is selected. As shown in view 120(II) in FIG. 3C, the signal strength indicator 138 indicates that the signal between the repeater control module 120*c* and the puller endpoint is at full strength with all bars in the indicator 138 illuminated.

Example implementations of the control module 120 in FIG. 3A may include an equipment switch input 152 to receive connection to a switch. In example implementations, the switch connected to equipment switch input 152 may be a foot switch. In other implementations, a hand switch or any other type of suitable switch may be connected to equipment switch input 152 as well. The control module 120 receives a trigger of the switch connected to equipment switch input 152 and notifies the control module at the opposite endpoint by sending a ready state message wirelessly to the other endpoint. In example implementations, the trigger of the switch 152 may be the pressing on the switch 112 (in FIG. 1A) by the operator. In example implementations, the operator maintains the switch 112 depressed during operation of the apparatus and lifts the foot off the switch 112 to stop operation. Alternatively, the message transmitted to the other endpoint may force the apparatus at the other endpoint to stop. For example, the receipt of the message at the other endpoint by the control module 120 may trigger an opening of a secondary switch for controlling the equipment output 160 thereby disabling operation of the apparatus.

The stop selector 146 may also be triggered by an operator at the control module 120*c* operating in a repeater mode when the operator sees an obstacle or any other reason for why the installation process should be stopped. The operator at the repeater control module 120*c* may trigger the stop selector 146 to send messages to both the puller endpoint and the feeder endpoint. If either or both endpoints include control modules 120*a* or *b*, the message to stop the apparatuses at the endpoints automatically by opening of the secondary switch thereby disabling operation of the apparatuses.

In an example implementation, the switch controlling each apparatus may need to be engaged to enable operation of the feeder and the puller apparatuses. Accordingly, the operator at the first endpoint may engage the switch connected to the control module at the first endpoint thereby causing the apparatus status indicator 132 or 134 to illuminate without enabling the apparatus at the first endpoint to operate. The operator at the opposite endpoint may, upon noticing the first endpoint status indicator illuminated, engage the switch connected to the control module at the opposite endpoint causing the other apparatus status indicator 132 or 134 to illuminate at both control modules. The control modules at both endpoints may then allow the apparatuses at both endpoints to operate as long as the switches at both endpoints are engaged.

In an example implementation, the apparatus connected to the control module 120 may begin operation when the control module 120 sends a start signal to the apparatus responsive to the operator triggering the switch 112. The start signal may be similar to the electrical signal that initiates operation of the apparatus when the switch 112 is connected directly to the apparatus. In another implementation, the triggering of the switch 112 may first send the ready state message to the apparatus at the other endpoint. The control module at the opposite endpoint may acknowledge readiness of the equipment at the first endpoint by wireless communication. The control module 120 at the first endpoint receives an acknowledgment message and illuminates the apparatus status indicator 134 or 132 to notify the operator at the first endpoint that the equipment at the opposite endpoint is ready to operate. When equipment at both endpoints is ready to operate, the control module at each endpoint sends the start signal to its corresponding equipment to initiate operation.

The control module 120 in FIG. 3A includes a power button 140 to start the power source (e.g. a battery, not shown) and a battery charge level indicator 142. The operator may monitor the battery charge level indicator 142 and connect the control module to a charger at a charge port 135 when the battery charge level indicator 142 indicates that the power level is too low.

Figure 4:
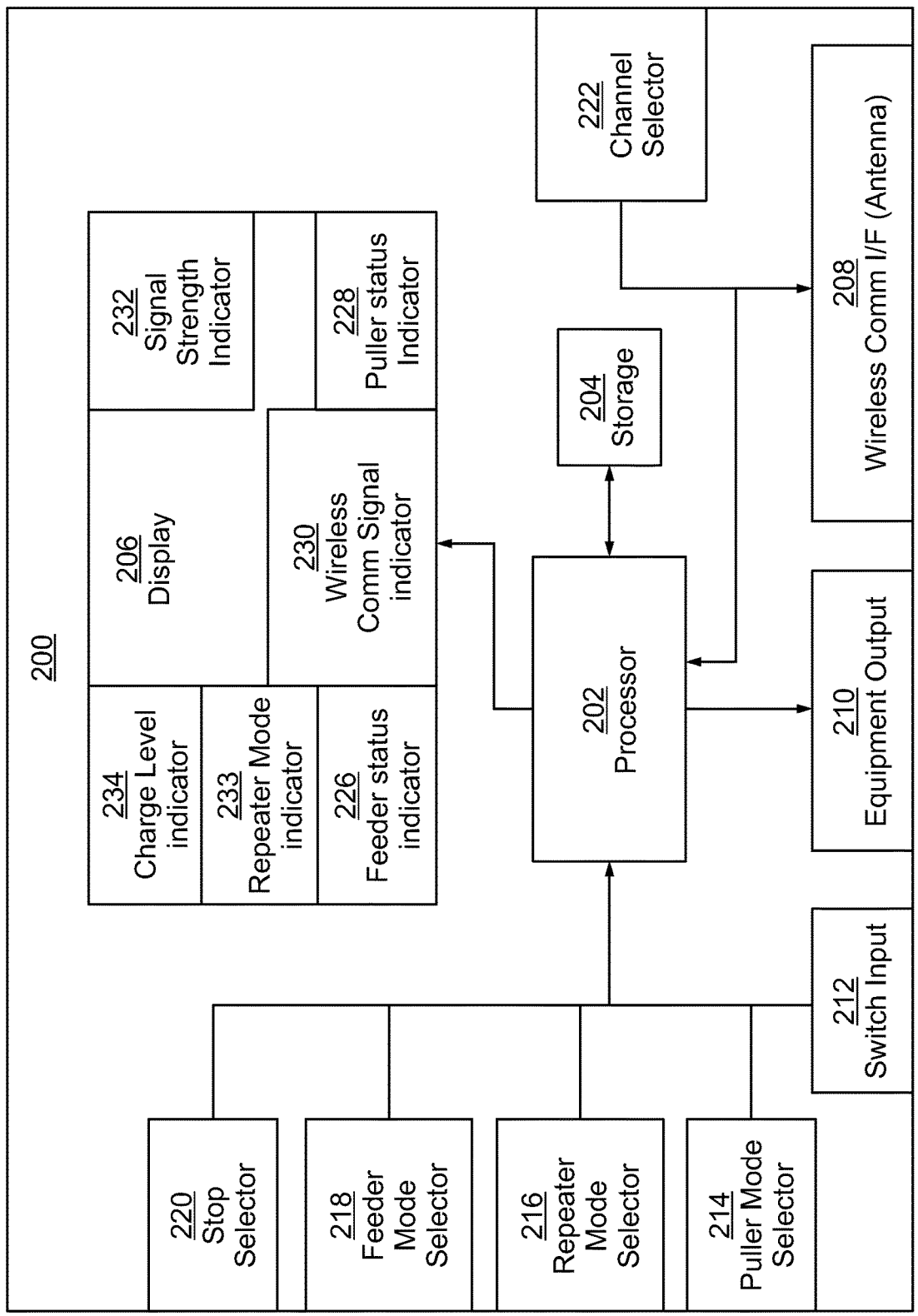
FIG. 4 is a block diagram of an example implementation of a control module.

FIG. 4 is a block diagram 200 of an example implementation of a control module 120 of the type described above with reference to FIGS. 1A, 1B, 2, 3A and 3B. The control module 120 in FIG. 4 includes a processor 202, a storage mechanism 204, a display 206, a wireless communication interface 208, an equipment output 210, a switch input 212, a puller mode selector 214, a repeater mode selector 216, a feeder mode selector 218, and a stop selector 220. The switch input 212 is a connection to an input device. The puller mode selector 214, the repeater mode selector 216, the feeder mode selector 218, and the stop selector 220 are either input devices or connections to input devices. The input devices may be implemented as mechanical buttons or as touch-panel selectors in an example implementation that uses a touch panel for the display. The input devices may also use mechanical buttons having a light emitting device, such as, for example, a light emitting diode that turns on and off as the state of the mechanical switch changes.

The switch input 212 may be a jack for a wire or cable (such as connection 113 in FIG. 1A) that attaches to a foot switch or a hand switch. Similarly, the equipment output 210 may be a jack as well to allow a male connector attached to a cable (such as connection 115 in FIG. 1A) that connects to the cable feeder or puller equipment. In an example implementation, the switch input 212 may be a female connection configured to receive a male jack connector on a cable attached to a switch. The equipment output 210 may be a female connection configured to receive a male jack connector on a male to male patch cord. The processor 202 receives a change of state signal from the switch input 212 indicating that the operator has either pressed or unpressed the switch 112 (in FIG. 1A). When the processor 202 receives the change of state at the switch input 212, the control module 120 sends a signal to the other endpoint (puller or feeder) to indicate to the other endpoint that it is ready. When the operator at the other endpoint presses the switch connected to the switch input 212 on the control module 120 of the other endpoint, both machines can begin to operate. The apparatus may be stopped by triggering the switch input to an off state. In example implementations, the operator may release the switch 112 (FIG. 1A), such as for example, by lifting the foot off the foot switch, to stop operation of the apparatus. The operator may stop operation in response to a problem with the pull or feed, or when the end of the pulling rope reaches the cable pulling apparatus, or for any other suitable reason.

When the control module 120 is operating in the repeater mode, the operator of the control module 120 used as the repeater may initiate the stoppage of the operation by both the puller and feeder apparatuses. The operator of the control module 120 used as the repeater may press the stop selector 146 on the control module 120 to signal the other endpoints to stop operating. When the control module 120 at the each endpoint receives a stop state message, the operators at the other endpoints may release the switch 112 or 118 (FIG. 1A) to stop operation of the corresponding endpoint apparatus. The stop command sent to the endpoints may need to be cleared at the control module 120 used as the repeater. The stop command may be cleared or removed by depressing the stop selector 146 a second time.

The wireless communication interface 208 may receive messages from the processor 202 to transmit to the other endpoint. In an example implementation, the messages include, for example, a Feeder/Puller ready and a Feeder/Puller stop message. The processor may execute program instructions that format a message and sends the message to the wireless communications interface 208. The wireless communications interface 208 then transmits the message according to a communications protocol for encoding and decoding messages. In example implementations, the wireless communications interface may be implemented using any suitable wireless technology, such as, for example, Bluetooth, Bluetooth Low Energy, WiFi, etc. or any other technology suitable for implementing a local area network, a micro network, a pico network, or any other suitable wireless network. In some example implementations, an ad hoc network may be designed using a communication protocol implemented using a simple signal modulation scheme. In other implementations, a communications protocol may be configured to include messages, commands, and other data transport schemes. In one example implementation, a ready state message and a stop state message are communicated between endpoint control modules. In other example implementations, additional messages and data may be communicated between endpoint control modules.

In an example implementation, one or more channel selectors 222 may be mounted on the control module housing and connected to the wireless communication interface 208 and the processor 202. When the operator selects the one or more channel selectors 222, the processor 202 and the wireless communications interface 208 switch to communicate on the selected channel.

The display 206 may be any suitable electronic display that may be configured to display images or LED indicator lights. The images may be areas of the display 206 that are illuminated to indicate one state and turned off to indicate another state. The images may have a form indicating the component or the state of the component. For example, the display 206 may include a feeder status indicator 226 shown on the display in the image of a cable feeder 134 as shown in FIG. 3A. The feeder status indicator 226 may be illuminated to indicate the cable feeder is ready or turned off when the cable feeder is not ready for operation. The display 206 may include a puller status indicator 228 shown on the display in the image of a cable puller 132 as shown in FIG. 3A. The puller status indicator 228 may be illuminated to indicate the cable puller is ready or turned off when the cable puller is not ready for operation. In another implementation, the feeder status indicator 226 and the puller status indicator 228 may be illuminated to indicate the equipment whose control module 120 is in the process of communicating wirelessly. A repeater mode indicator 233 may be included to illuminate when the operator has configured the control module 120 to operate in the repeater mode. It may remain illuminated while either the puller status indicator 228 or the feeder status indicator 226 illuminate or blink when signals are communicated to and from the repeater control module.

The display 206 may include a signal strength indicator 232 to indicate the current strength of the radio signal being communicated by the control module 120. As shown in FIG. 3A, the signal strength indicator 232 may graphically indicate levels of strength. In alternative embodiments, the signal strength may be indicated qualitatively as being good, ok, and bad, for example. The display 206 may provide the signal strength indicator 232 with color to provide added information. For example, when the stop button is pressed or when a stop state message is received from the other endpoint, the signal strength indicator 232 may display the signal lights in red, or flashing red. The signal lights in the signal strength indicator 232 may also illuminate in green during endpoint to endpoint communication.

If the control module 120 is in repeater mode, the signal lights in the signal strength indicator 232 may flash green periodically to show that the control module 120 is in endpoint to endpoint communication. Referring to FIG. 3C, the operation of the control module 120c in repeater mode may be enhanced using the signal strength indicator 138 (232 in FIG. 4) and the apparatus status indicators 132 and 134 (226 and 228 in FIG. 4). When the control module 120c enters repeater mode, the repeater control module 120c may establish a signal communication with the feeder endpoint, for example, and indicate the signal communication by blinking the feeder mode indicator 130a (in FIG. 3A) and show the signal strength indicator 138 (in FIG. 3A) for a predetermined period of time, such as for example 3 to 5 seconds. After the period of time, the repeater control module 120c can blink the puller mode indicator 130c (in FIG. 3A) and show the signal strength indicator 138 for the predetermined period of time. The operator of the repeater control module 102c is thereby afforded a view comparing the signal strengths between the repeater control module 120c and each endpoint. The operator can then determine whether the repeater control module 120c should be moved to a different location to enhance the overall signal strength between the endpoints and the repeater. In the example shown in FIG. 3C, the signal strength between the repeater control module 120c and the puller endpoint at view 120(II) is greater than the signal strength between the repeater control module 120c and the feeder endpoint at view 120(I). The operator of the repeater control module 120c may then seek a better balance of signal strengths by finding a position closer to the feeder endpoint.

The display 206 may also include a charge level indicator 142 to communicate the current charge level of the power source, which may be a battery. The battery may be rechargeable. A charge port 135 may be added to the control module 120 as shown in FIG. 3A. A charger of a type that is well known in the art may be plugged in at the charge port 135 and to a secondary power source, such as for example, an AC power outlet or a USB power supply using DC power. The charge level indicator 142 may communicate to the operator when it may be time to connect the control module 120 to a charger.

It is noted that in other implementations, the display 206 may be implemented using individual lights. For example, LEDs may be distributed on the surface of the control module 120 and controlled as described herein to provide a similar functionality.

The processor 202 may be any suitable logic processing device configured to execute machine instructions, which may be stored in a storage mechanism 204. The processor 202 communicates with the input devices and the output devices over a suitable bus, or internal communications interface. Any suitable processor may be used.

Figure 5A:
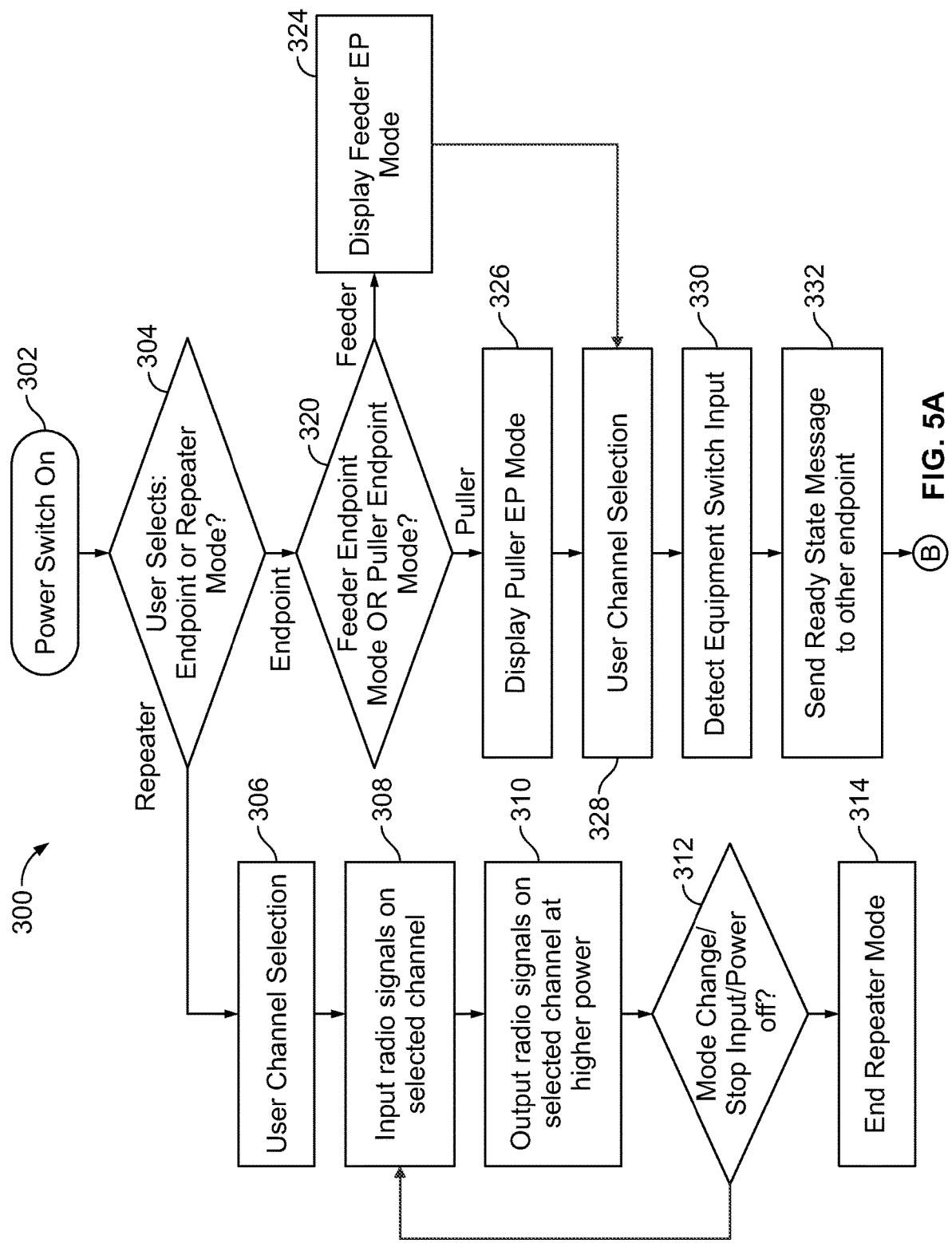
Figure 5A:
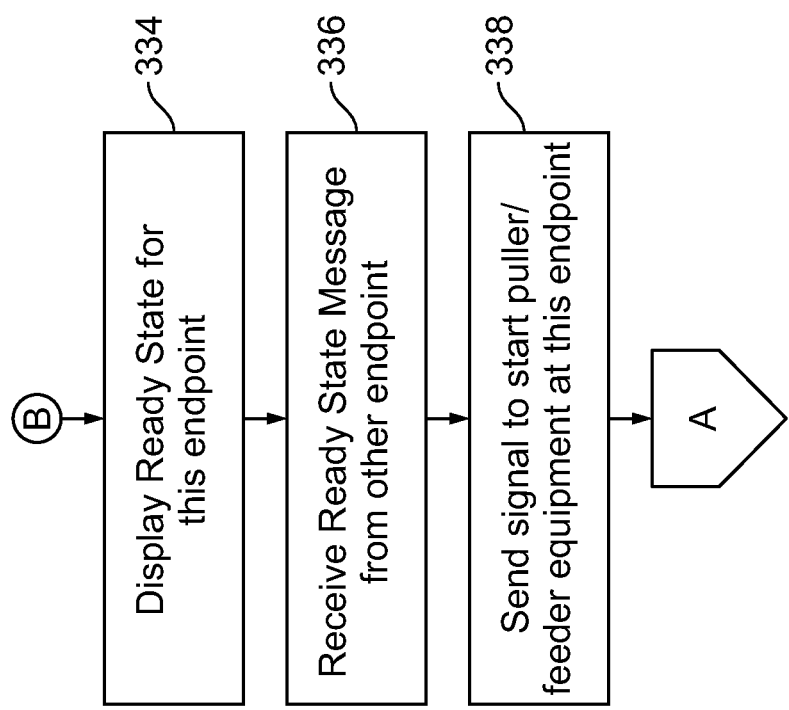

FIGS. 5A and 5B are flowcharts illustrating operation of example methods for wirelessly controlling a cable installing system. FIG. 5A is a flowchart 300 illustrating example methods for initiating a cable pulling operation in accordance with example implementations of the control module described with reference to FIG. 4. FIG. 5B is a flowchart 340 illustrating methods for stopping operation of the cable pulling operations. The description of the flowcharts below is made with reference to example implementations of the control module as described in FIGS. 1A-4 above unless otherwise specified. The configuration used as an example is configuration 178 in FIG. 1B wherein a control module is connected to control the cable installing equipment at each endpoint. Those of ordinary skill in the art will understand the use of the control module in other configurations from the description below with reference to FIGS. 5A and 5B.

A cable pulling and feeding operation may be initiated by first positioning the cable feeding apparatus 100 at one endpoint and the cable pulling apparatus 101 at the opposite endpoint in a manner similar to the setup illustrated in FIG. 2. At the pulling endpoint, a spool of pulling rope is positioned and the pulling rope is fed through the conduit towards the feed side. The pulling rope is attached to a cable on a spool on the feeder side. The free end of the cable on the spool is fed through the rotating members on the cable feeder apparatus to attach to the pulling rope between the conduit exit/entrance and the cable feeding apparatus. The puller at the other endpoint then pulls on the pulling rope to pull the cable into the conduit as the feeder feeds the cable from the spool. An operator may be positioned at each endpoint through the process of setting up the operation, and only one operator at one endpoint needs to monitor the operation.

At step 302, the operator at each endpoint switches the power of the control module at the operator's corresponding endpoint to ON. When powered on, the control module may perform an initialization process before waiting for the operator to begin. At decision block 304, the operator selects an operating mode. It is noted that the example illustrated in FIG. 2 depicts operation of the system using three control modules 120a, 120b, 120c. Control module 120a and control module 120b are positioned to operate as endpoint control modules. Control module 120c is positioned to operate as a repeater. For control module 120c, an operator may select the repeater mode, which executes to step 306. At step 306, the operator selects a channel on which to operate as a repeater. The channel selection may be made beforehand. Once the endpoint control modules are positioned, the operators may test each channel to determine the channel communicating the strongest signal. At that point, an operator may go back to the repeater control module 120c to select the same channel as the endpoint control modules 120a, 120b. At step 308, the control module 120c receives radio signals as input on the selected channel. At step 310, the received radio signals may be transmitted by the repeater control module 120c via the wireless communication interface of the repeater control module 120c. By re-transmitting the radio signals at the wireless communication interface, the radio signals are amplified relative to the radio signals received at step 308. At decision block 312, the control module may be interrupted by a mode change (to endpoint), a stop command, or a power off. If the mode changes, a stop command is received, or power off is detected, the operation of the repeater control module 120c is ended at step 314.

It is noted that the repeater mode provides a line of sight for the wireless communications when distance or obstacles affect the communication. Accordingly, an operator may be positioned near the repeater control module. When the control module receives the stop command responsive to the operator pressing the stop selector 146 on the control module, the control module in repeater mode may send stop status messages to the control modules operating at the endpoints. The operator of the control module 120 being used in repeater mode may press the stop selector 146 if the operator sees circumstances affecting the cable installation within the conduit that require the operation be halted. For example, one such circumstance may involve a construction operation that affects the state of the conduit in which the cable is being installed.

Referring back to step 304, the operator at each endpoint selects the endpoint mode for the control module at the corresponding endpoint. The operator at each endpoint may select either a feeder endpoint mode or a puller endpoint mode. The feeder operator at the feeder endpoint selects the feeder endpoint mode transferring execution to step 324. At step 324, the control module illuminates a light emitter on the feeder endpoint mode selector 132 in FIG. 3A to indicate that the feeder endpoint mode is selected. The puller operator at the puller control module 120a selects the puller mode selector at decision block 320. At step 326, the puller control module 120a may illuminate a light emitter at the puller endpoint mode selector 134 in FIG. 3A to indicate that the puller endpoint mode is selected. After displaying the endpoint mode selected, the control module at each endpoint performs a channel selection process at step 328. The channel selection process may be performed by each operator selecting a channel selector 136. The operators may check each channel to identify the channel with the strongest signal.

The endpoint control modules at step 328 should be communicating signals and waiting for an operator input signal. At step 330, the operator at one of the endpoints actuates the switch 112, 118 (FIG. 1A) connected to the switch input. In an example implementation, the operator of either endpoint apparatus presses the switch 112, 118 and leaves the switch 112, 118 actuated as long as the operator desires to have the apparatus operate. When the equipment switch input is detected by the control module, the control module sends a ready state message to the opposite endpoint control module at step 334. In addition, the control module 120 may also illuminate the apparatus status indicator corresponding to the equipment connected to the control module. The puller endpoint control module 120*a* illuminates the puller status indicator 132 (in FIG. 3A) and the feeder endpoint control module 120*b* illuminates the feeder status indicator 134. At step 336, the control module 120 receives a ready state message from the opposite endpoint. The puller control module 120*a* illuminates the feeder status indicator 134 on the puller endpoint control module 120*a*. The feeder control module 120*b* illuminates the puller status indicator 132 on the feeder control module 120*a*. At step 338, each control module 120*a*, 120*b* has sensed that both endpoints are ready to begin the pulling operation and sends a start signal to the corresponding puller/feeder apparatus connected to each control module 120*a*, 120*b* to command the equipment (feeder 100 and puller 101) to begin operating.

Once both the feeding apparatus and the pulling apparatus are operating, the feeding apparatus feeds cable into the conduit 107 as the pulling apparatus pulls on the cable at the opposite endpoint. Referring to FIG. 5B, the operator of the puller apparatus may note that the pulling process is nearing completion. At a point deemed appropriate by the operator, the operator of the control module used in repeater mode may press the stop selector 146 (FIG. 3A) to stop the operation at step 350. At step 352, the control module 120*c* at which the operator pressed the stop switch detects the pressing of the stop selector and sends a stop message to the cable pulling apparatus and the cable feeding apparatus connected to the control modules 120*a*, 120*b* to turn the equipment off. At step 354, the puller status indicator or the feeder status indicator at the corresponding endpoints is turned off. At step 356, the repeater control module 120*c* at which the operator pressed the stop selector sends a stop message to the endpoint control module at the other endpoints. The other endpoint control modules then send a stop message to the cable pulling or feeding apparatus attached to the opposite endpoint control module to signal that the equipment should be turned off thereby ending the operation of both the puller 100 and the feeder 101. The operator at the repeater control module 120*c* may then need to press the stop selector 146 on the repeater control module to reset the stop function.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A control arrangement for use in a cable installing system, the cable installing system including a first apparatus located at a first endpoint, and a second apparatus located at a second endpoint, the first and second apparatus together configured to install a cable through a conduit between the first endpoint and the second endpoint, the control arrangement comprising:
   a first control module located proximate to the first endpoint and operatively coupled to the first apparatus, the first apparatus having an electric motor coupled to a source of power;
   a second control module located proximate to the second endpoint and operatively coupled to the second apparatus, the second apparatus having a electric motor coupled to a source of power;
   each control module having a wireless communication interface to facilitate wireless communication between the first control module and the second control module;
   each control module having a switch input configured to receive an input signal from an operator-activated switch, the input signal indicating either a ready state or a stop state;
   each control module further having an apparatus output configured to provide a machine-activation signal or a machine-deactivation signal to the respective first or second apparatus;
   wherein the machine-activation signal and the machine-deactivation signal are separate and independent form the source of power that drives the motors of the first second apparatus;
   wherein when the first control module receives the input signal from the corresponding operator-activated switch indicating the ready state, the first control module wirelessly transmits a ready signal to the second control module; and
   wherein upon receipt of the ready signal by the second control module, and if the second control module receives the input signal from the corresponding operator-activated switch, the second control module wirelessly transmits a start signal to the first control module, and thereafter, both control modules transmit the corresponding machine-activation signal to the correspondingly coupled first apparatus and second apparatus.

2. The control arrangement of claim 1, further including:
   a third control module operatively disposed between the first control module and second control module, and configured to operate in a repeater mode;
   the third control module configured to wirelessly receive the ready signal from the first control module and wirelessly relay the ready signal to the second control module; and
   the third control module configured to wirelessly receive the start signal from the second control module and wirelessly relay the start signal to the first control module.

3. The control arrangement of claim 2, wherein each control module is selectively configured to operate in an endpoint mode or in a repeater mode.

4. The control arrangement of claim 3, wherein each control module further includes a display configured to display an indication whether the respective control module is operating in the endpoint mode or in the repeater mode.

5. The control arrangement of claim 4, wherein each control module includes a signal strength analyzer and wherein the display is configured to display a signal strength indicator corresponding to a signal strength measured by the signal strength analyzer.

6. The control arrangement of claim 4, where the display provides an indication according to the ready state or the stop state of the corresponding first and second apparatus.

7. The control arrangement of claim 3, wherein the first control module and second control module are configured to operate in the endpoint mode, and the third control module is configured to operate in the repeater mode.

8. The control arrangement of claim 1, wherein the first apparatus is either a cable pulling apparatus or a cable feeding apparatus, and the second apparatus is the other of the cable feeding apparatus or the cable pulling apparatus.

9. The control arrangement of claim 1, wherein when the first control module receives the input signal from the corresponding operator-activated switch indicating the stop state, the first control module wirelessly transmits a stop signal to the second control module, and upon receipt of the stop signal by the second control module, the second control module wirelessly transmits a stop-acknowledge signal to the first control module, and both control modules transmit the corresponding machine-deactivation signal to the respectively coupled first apparatus and second apparatus to deactivate the first apparatus and the second apparatus.

10. The control arrangement of claim 1, wherein the first control module further includes a display configured to indicate whether the first apparatus is a cable pulling apparatus or a cable feeding apparatus, and the second control module further includes a display configured to indicate whether the second apparatus is the other of the cable pulling apparatus or the cable feeding apparatus.

11. The control arrangement of claim 1, wherein transmission of the machine-activation signal by the first control module and second control module causes activation of the corresponding apparatus if the corresponding control module indicates the ready state.

12. The control arrangement of claim 1, wherein the apparatus output of each control module is operatively coupled by a wired connection to the corresponding apparatus.

13. The control arrangement of claim 1, wherein the operator-activated switch is a foot switch or a hand switch.

14. The control arrangement of claim 1, further including a battery in each control module configured to provide electrical power to the corresponding control module.

15. A control arrangement for use in a cable installing system, the cable installing system including a first apparatus located at a first endpoint, and a second apparatus located at a second endpoint, the first and second apparatus together configured to install a cable through a conduit between the first endpoint and the second endpoint, the control arrangement comprising:

a first control module located proximate to the first endpoint and operatively coupled to the first apparatus, the first apparatus having an electric motor coupled to a source of power;

a second control module located proximate to the second endpoint and operatively coupled to the second apparatus, the second apparatus having an electric motor coupled to a source of power;

a repeater control module operatively disposed between the first control module and second control module, and configured to operate as a repeater;

wherein the repeater control module, the first control module, and the second control module are configurable according to a repeater operational mode or an endpoint operational mode, and are other wise hardware-identical;

each control module having a wireless communication interface to facilitate wireless communication between the control modules;

the first control module and second control module having a corresponding switch input configured to receive an input signal from a corresponding operator-activated switch, the input signal indicating either a ready state or a stop state;

the first control module and second control module having a corresponding apparatus output configured to provide a machine-activation signal or a machine-deactivation signal to the corresponding first apparatus or second apparatus;

wherein the machine-activation signal and the machine-deactivation signal are separate and independent form the source of power that drives the motors of the first and second apparatus;

wherein when the first control module receives the input signal from the corresponding operator-activated switch indicating the ready state, the first control module wirelessly transmits a ready signal to the repeater control module, and the repeater control module wirelessly relays the ready signal to the second control module; and wherein upon receipt of the ready signal by the second control module, and if the second control module receives the input signal from the corresponding operator-activated switch, the second control module wirelessly transmits a start signal to the repeater control module, and the repeater control module wirelessly relays the start signal to the first control module, and thereafter, both control modules transmit the machine-activation signal to the respectively coupled first apparatus and second apparatus.

16. The control arrangement of claim 15, wherein the first apparatus is either a cable pulling apparatus or a cable feeding apparatus, and the second apparatus is the other of the cable feeding apparatus or the cable pulling apparatus.

17. The control arrangement of claim 15, wherein the first control module and second control module are configured to operate in an endpoint mode, and the repeater control module is configured to operate in a repeater mode.

18. The control arrangement of claim 17, wherein each control module further includes a display configured to display an indication whether the respective control module is operating in the endpoint mode or in the repeater mode.

* * * * *